(12) United States Patent
Lee et al.

(10) Patent No.: US 7,733,837 B2
(45) Date of Patent: Jun. 8, 2010

(54) APPARATUS AND METHOD FOR ADJUSTING AN INPUT RANGE FOR A SOFT-DECISION DECODER

(75) Inventors: Jae-Hawk Lee, Seoul (KR); Hyun-Kuk Choi, Seoul (KR); Seong-Kyu Hwang, Seoul (KR); Jeoung-Gil Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 682 days.

(21) Appl. No.: 11/029,012

(22) Filed: Jan. 5, 2005

(65) Prior Publication Data
US 2005/0174980 A1 Aug. 11, 2005

(30) Foreign Application Priority Data
Jan. 5, 2004 (KR) .................. 10-2004-0000389

(51) Int. Cl.
H04B 7/216 (2006.01)
(52) U.S. Cl. .................. 370/342; 370/320; 370/335; 370/479; 370/480; 455/65; 375/341
(58) Field of Classification Search .................. 370/320, 370/335, 342, 479, 480; 455/65
See application file for complete search history.

(56) References Cited

U.S. PATENT DOCUMENTS

| | | | | |
|---|---|---|---|---|
| 6,973,143 | B2 * | 12/2005 | Jurgensen et al. | 375/340 |
| 7,146,552 | B2 * | 12/2006 | Kim et al. | 714/755 |
| 2002/0168033 | A1 * | 11/2002 | Suzuki et al. | 375/341 |
| 2002/0186797 | A1 * | 12/2002 | Robinson | 375/341 |
| 2003/0126551 | A1 * | 7/2003 | Mantha et al. | 714/790 |
| 2003/0138054 | A1 * | 7/2003 | Ha et al. | 375/261 |

(Continued)

FOREIGN PATENT DOCUMENTS

GB 2 395 399 5/2004

(Continued)

OTHER PUBLICATIONS

Lee Y. K. et al., "Normalization, Windowing and Quantization of Soft-Decision Viterbidecoder Inputs in CDMA systems", Vehicular Technology Conference, 1999 IEEE 49th Houston, TX, USA May 16-20, 1999, Piscataway, NJ, USA, IEEE, U.S., vol. 1, May 16, 1999.

Primary Examiner—Rafael Pérez-Gutiérrez
Assistant Examiner—Liton Miah
(74) Attorney, Agent, or Firm—Roylance, Abrams, Berdo & Goodman, LLP

(57) ABSTRACT

An apparatus and method for adjusting a desired expression section according to input bit values in a mobile communication system that expresses only a defined partial section of the input bit values in order to make the number of output bits be less than the number of the input bits, and maps bit values included in unexpressed sections to a specific value is provided. In the apparatus and method, a measurer divides possible output bit values into at least three sections, and measures output frequencies of output bits for the respective sections for a predetermined time. A controller adjusts the desired expression section, when an output frequency for a specific section is greater than output frequencies for other sections.

17 Claims, 5 Drawing Sheets

U.S. PATENT DOCUMENTS

2003/0171121 A1* 9/2003 Kim et al. .................. 455/451
2003/0234642 A1* 12/2003 Clegg et al. ................ 324/115

FOREIGN PATENT DOCUMENTS

| JP | 06-029951 | 2/1994 |
| JP | 2003-078506 | 3/2003 |
| WO | 01/47137 | 6/2001 |
| WO | 02/47276 | 6/2002 |
| WO | 03/085917 | 10/2003 |

* cited by examiner

US 7,733,837 B2

APPARATUS AND METHOD FOR ADJUSTING AN INPUT RANGE FOR A SOFT-DECISION DECODER

PRIORITY

This application claims the benefit under 35 U.S.C. §119 (a) to an application entitled "Apparatus and Method for Adjusting Input Range for Soft-Decision Decoder" filed in the Korean Intellectual Property Office on Jan. 5, 2004 and assigned Serial No. 2004-389, the entire contents of which are incorporated herein by reference.

BACKGROUND OF THE INVENTION

1. Field of the Invention

The present invention relates generally to a decoder in a mobile communication system. In particular, the present invention relates to an apparatus and method for adjusting an input range of data input to a decoder for performance improvement of a soft-decision decoder.

2. Description of the Related Art

A mobile communication system wirelessly transmits/receives data. However, because data is wirelessly transmitted/received in the mobile communication system, it is difficult for a receiver to correctly receive data transmitted from a transmitter. In order to solve this problem, the transmitter encodes transmission data before transmission, and the receiver decodes the encoded data to receive the original data.

FIG. 1 is a block diagram illustrating a structure of a general transceiver in a mobile communication system. With reference to FIG. 1, a description will be made of a structure of a transceiver in a mobile communication system.

Referring to FIG. 1, in a transmitter, input bits comprising a binary signal are input to an encoder 100. The encoder 100 encodes the input bits, and outputs coded bit streams to a matcher 102. The matcher 102 performs rate matching on the serial coded bit streams taking the number of output bits transmitted over a radio frame into consideration, and delivers the rate-matched bit streams to an interleaver 104. The interleaver 104 performs interleaving on the rate-matched bit streams such that the coded bit streams should be robust against a burst error, and outputs the interleaved bit streams to a modulator 106. The modulator 106 symbol-maps the interleaved bit streams according to a symbol mapping constellation. The modulator 106 supports Quadrature Phase Shift Keying (QPSK), 8-ary Phase Shift Keying (8PSK), 16-ary Quadrature Amplitude Modulation (16QAM) and 64QAM as its modulation scheme. The number of bits constituting the symbol is defined depending on the modulation scheme. A symbol comprises 2 bits for the QPSK modulation, 3 bits for the 8PSK modulation, 4 bits for the 16QAM modulation, and 6 bits for the 64QAM modulation. The modulated symbols output from the modulator 106 are transmitted via a transmission antenna 108.

In a receiver, symbols transmitted via the transmission antenna 108 are received by a reception antenna 110. The symbols received by the reception antenna 110 are input to a demodulator 112. The demodulator 112 has the same symbol mapping constellation as that of the modulator 106, and converts the received symbols into binary bit streams according to the symbol mapping constellation. That is, the demodulation scheme is determined by the modulation scheme. The binary bit streams demodulated by the demodulator 112 are delivered to a deinterleaver 114. The deinterleaver 114 deinterleaves the demodulated binary bit streams according to the same scheme as the interleaving scheme of the interleaver 104, and outputs the deinterleaved binary bit streams to a dematcher 116. The dematcher 116 removes repeated bits when the matcher 102 performed bit repetition, and reproduces punctured bits when the matcher 102 performed puncturing, and outputs the result bit streams to a decoder 118. The decoder 118 decodes the rate-dematched binary bit streams into binary bits.

FIG. 2 is a block diagram illustrating a structure of a general receiver using a Viterbi decoder. The receiver of FIG. 2 is made by adding a range adjuster 206 to the receiver of FIG. 1. The range adjuster will be described below. Generally, one modulation symbol output from a demodulator 200 comprises 10 bits or less. Here, a decoder 208 can estimate a signal from a transmitter with less-than-10 bits. Generally, the decoder 208 can correctly estimate a signal from the transmitter with only 3 or 4-bit information. When the number of bits input to the decoder 208 (or output from the range adjuster 206) is 3, there are 8 possible expressions. When the number of bits input to the decoder 208 is 4, there are 16 possible expressions. Table 1 illustrates possible expressions for the case where the number of bits input to the decoder 208 is 3.

TABLE 1

| Bits input to decoder | Decimal expression |
| --- | --- |
| 100 | −4 |
| 101 | −3 |
| 110 | −2 |
| 111 | −1 |
| 000 | 0 |
| 001 | 1 |
| 010 | 2 |
| 011 | 3 |

Table 2 illustrates possible expressions for the case where the number of bits input to the decoder 208 is 4.

TABLE 2

| Bits input to decoder | Decimal expression |
| --- | --- |
| 1000 | −8 |
| 1001 | −7 |
| 1010 | −6 |
| 1011 | −5 |
| 1100 | −4 |
| 1101 | −3 |
| 1110 | −2 |
| 1111 | −1 |
| 0000 | 0 |
| 0001 | 1 |
| 0010 | 2 |
| 0011 | 3 |
| 0100 | 4 |
| 0101 | 5 |
| 0110 | 6 |
| 0111 | 7 |

According to Table 1, the 8 possible expressions include −4 to 3, and according to Table 2, the 16 possible expressions include −8 to 7. The range adjuster 206 has a function of adjusting an expression form of one symbol delivered to the decoder 208. A description will now be made of the reason why the range adjuster 206 adjusts an expression form of one symbol.

As described above, a binary bit stream for one symbol delivered to the range adjuster 206 is generally comprises about 10 bits, and a binary bit stream for one symbol output from the range adjuster 206 is generally comprises 3 or 4 bits. Therefore, values that cannot be expressed with the 3 or 4 bits among the input bit values should be mapped to values that can be expressed with the 3 or 4 bits. Table 3 illustrates possible expressions for the case where the number of bits input to the range adjuster 206 is 6 and the number of bits output from the range adjuster 206 is 4.

TABLE 3

| Input bits | Decimal expression of input bits | Output bits | Decimal expression of output bits |
| --- | --- | --- | --- |
| 100000 | −32 | 1000 | −8 |
| 100001 | −31 | 1000 | −8 |
| . | . | . | . |
| . | . | . | . |
| . | . | . | . |
| 111000 | −8 | 1000 | −8 |
| 111001 | −7 | 1001 | −7 |
| . | . | . | . |
| . | . | . | . |
| . | . | . | . |
| 000000 | 0 | 0000 | 0 |
| . | . | . | . |
| . | . | . | . |
| . | . | . | . |
| 000110 | 6 | 0110 | 6 |
| 000111 | 7 | 0111 | 7 |
| . | . | . | . |
| . | . | . | . |
| . | . | . | . |
| 011110 | 30 | 0111 | 7 |
| 011111 | 31 | 0111 | 7 |

As illustrated in Table 3, the values that cannot be expressed with the output bits are mapped to the smallest value and the largest value among the values that can be expressed with the output bits. That is, according to Table 3, when the input bit value is smaller than −8, the output bit value is expressed with −8 (1000), and when the input bit value is larger than 7, the output bit value is expressed with 7 (0111).

However, a soft-decision decoder can obtain its maximum performance when as many input values as possible can be expressed. That is, the soft-decision decoder can perform more accurate decoding when all of the input bits, including −32 (100000) and 31 (011111), are input. Therefore, it is necessary to express, with the 4 output bits, even the possible maximum value that can be expressed with the 6 input bits.

In a conventional method, an adjustment constant 'k' of the range adjuster is set to one fixed value so that as many input values to the soft-decision decoder as possible can be expressed, or the adjustment constant 'k' is adjusted according to an arithmetic mean value. However, when the range adjuster uses the one fixed value, it cannot efficiently express its input values. Referring to Table 3, when values smaller than −8 and values larger than 7 among input values to the range adjuster are more frequently input to the range adjuster as compared with other values, it is necessary to express the values smaller than −8 and the values larger than 7 in detail. For example, a method capable of distinguishing −10 and −23 should be provided. However, when the adjustment constant is fixed, there is no way to distinguish −10 and −23. Therefore, when the adjustment constant has a fixed value, the range adjuster cannot flexibly operate according to the input bit values.

Also, when the range adjuster adjusts the number of bits delivered to the decoder according to an arithmetic mean value, it has the following disadvantage. The range adjuster arithmetically averages its output bit values for a predetermined time. When the arithmetic mean value is close to −8 or 7, the adjustment constant is adjusted, and even when the arithmetic mean value is close to 0, the adjustment constant is adjusted. However, the operation of arithmetically averaging the output bit values causes an increase in memory capacity, calculations and complexity. For example, when the number of output bits is 4, 9-bit memories are required in order to perform arithmetic calculation (summation) on the output bits 128 times, increasing the complexity. In addition, in order to increase the accuracy of the arithmetic mean value, it is necessary to use a value obtained by performing arithmetic averaging calculation for a long time. However, the memory capacity increases in proportion to the number of calculations on the output bits, causing an increase in circuit complexity.

SUMMARY OF THE INVENTION

It is, therefore, an object of the present invention to provide an apparatus and method for adjusting the number of output bits (or a range of input data) according to an input bit value to a range adjuster.

It is another object of the present invention to provide an apparatus and method for adjusting the number of output bits without an increase in memory capacity.

It is further another object of the present invention to provide an apparatus and method for adjusting the number of output bits without an increase in circuit complexity.

In accordance with one aspect of the present invention, there is provided a method for adjusting a desired expression section according to input bit values in a mobile communication system that expresses only a defined partial section of the input bit values in order to make the number of output bits less than the number of the input bits, and maps bit values included in unexpressed sections to a specific value. The method comprises the steps of dividing possible output bit values into at least three sections, and measuring output frequencies of output bits for the respective sections for a predetermined time; and adjusting the desired expression section, when an output frequency for a specific section is greater than output frequencies for other sections.

In accordance with another aspect of the present invention, there is provided an apparatus for adjusting a desired expression section according to input bit values in a mobile communication system that expresses only a defined partial section of the input bit values in order to make the number of output bits less than the number of the input bits, and maps bit values included in unexpressed sections to a specific value. The apparatus comprises a measurer for dividing possible output bit values into at least three sections, and measuring output frequencies of output bits for the respective sections for a predetermined time; and a controller for adjusting the desired expression section, when an output frequency for a specific section is greater than output frequencies for other sections.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will now be described in detail with reference to the accompanying drawings. In the following description, a detailed description of known functions and configurations incorporated herein has been omitted for conciseness.

Figure 1:
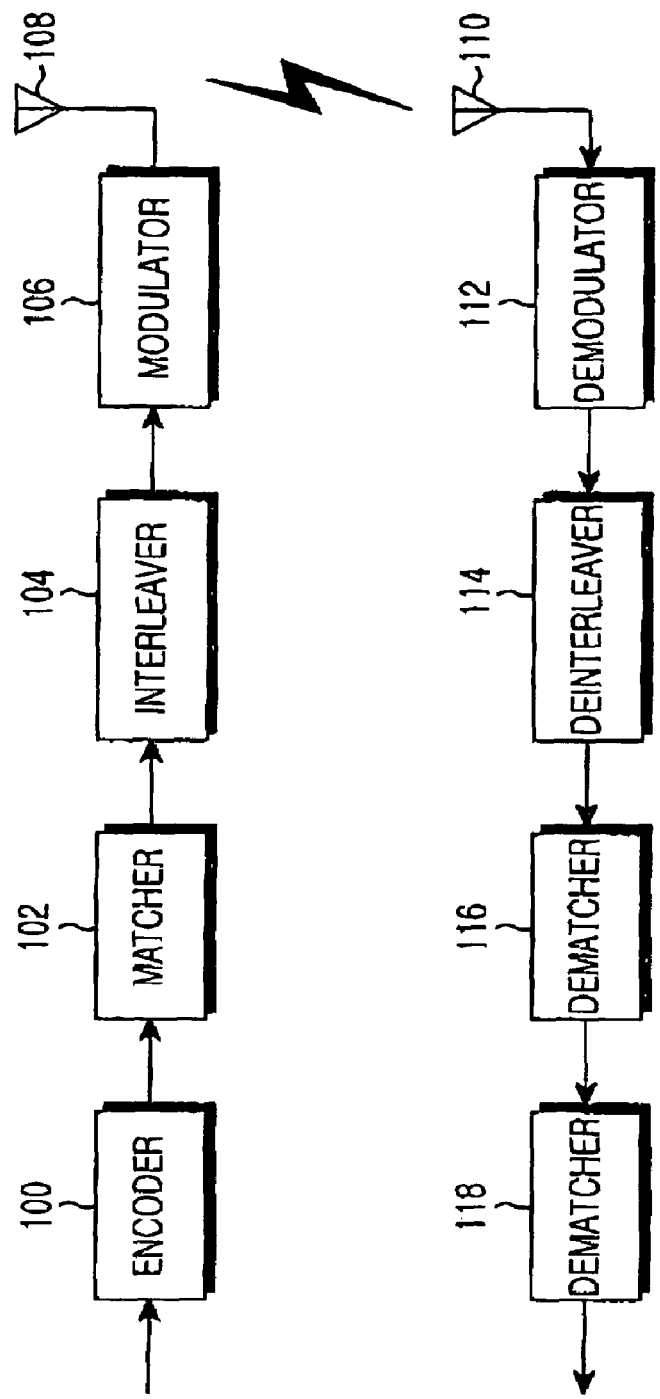
FIG. 1 is a block diagram illustrating a conventional transceiver in a mobile communication system.
Figure 2:
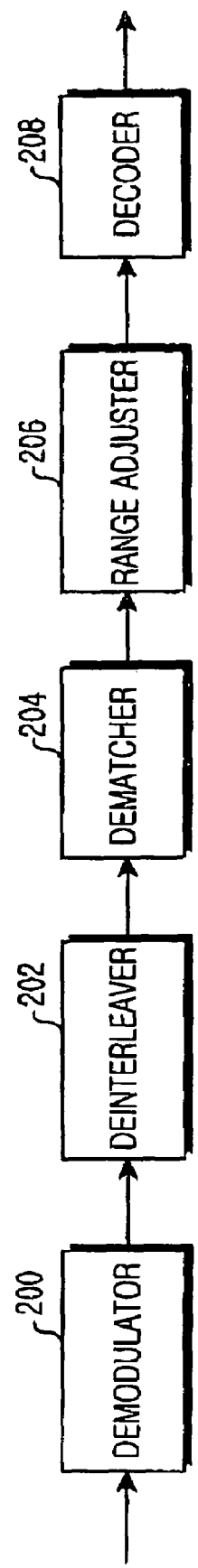
FIG. 2 is a block diagram illustrating a conventional receiver with a range adjuster in a mobile communication system.
Figure 3:
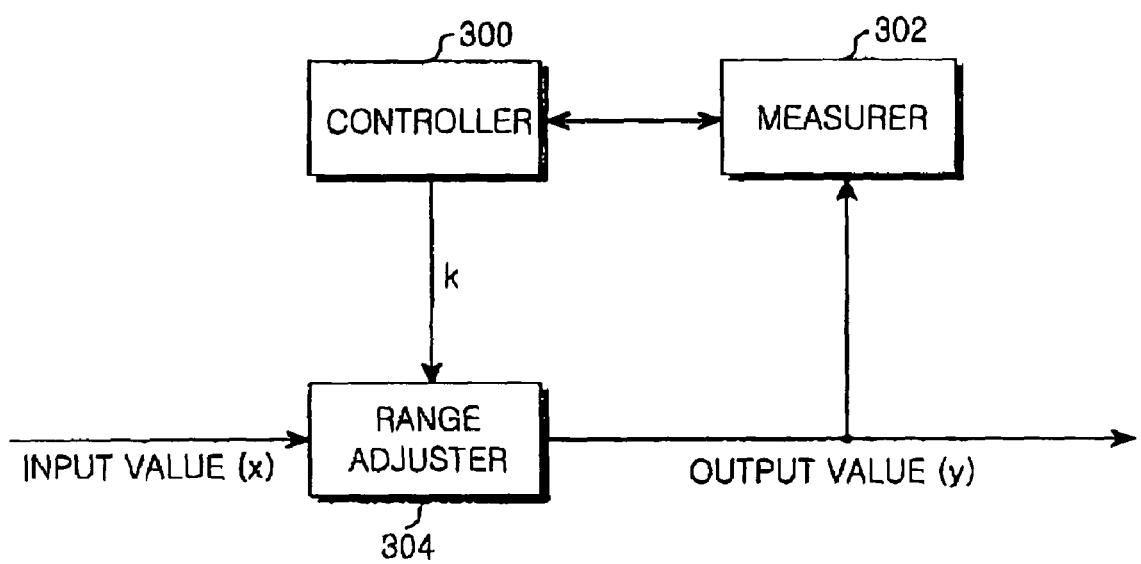
FIG. 3 is a block diagram illustrating a range adjuster and its associated elements for controlling the range adjuster according to an embodiment of the present invention.

FIG. 3 is a block diagram illustrating a range adjuster and its associated elements for performing range adjustment according to an embodiment of the present invention. The structure illustrated in FIG. 3 includes a range adjuster 304, a measurer 302, and a controller 300. The controller 300 can perform a control operation on other elements in a receiver in addition to a control operation on the range adjuster 304. A detailed description will now be made of operations performed by the elements illustrated in FIG. 3.

The range adjuster 304 adjusts an expression range of an input signal according to a control signal provided from the controller 300. Referring to FIG. 3, the number of bits input to the range adjuster 304 is 'x', and the number of bits output from the range adjuster 304 is 'y'. Of course, an operation according to the embodiment of the present invention is performed when a value of the x is larger than a value of the y. When a value of the x is equal to a value of the y, it is not necessary to perform an operation according to the embodiment of the present invention because the range adjuster 304 outputs the input bit value as it is. The range adjuster 304 resets a desired expression range taking the existing number of output bits into consideration depending upon an adjustment constant 'k' provided from the controller 300. Equation (1) illustrates a relation between an input value and an output value of the range adjuster 304.

$$y = x/2^k \quad (1)$$

where y denotes an output value from the range adjuster 304, x denotes a input value to the range adjuster 304, and k denotes an adjustment constant and is provided from the controller 300 as described above.

A description will now be made of an operation performed when an input value that can be expressed is changed according to the k. In the following description, bit values of the x and the y are expressed in decimal numbers. If the number of input bits to the range adjuster 304 is 8, the x has a value between −128 and 127. If the number of output bits from the range adjuster 304 is 4, the y has a value between −8 and 7. Table 4 illustrates a possible expression range in the range adjuster 304 for k=1.

TABLE 4

| Value of x | Value of y |
| --- | --- |
| −16 and below | −8 |
| −15, −14, | −7 |
| −13, −12, | −6 |
| −11, −10, | −5 |
| −9, −8, | −4 |
| −7, −6, | −3 |

TABLE 4-continued

| Value of x | Value of y |
| --- | --- |
| −5, −4, | −2 |
| −3, −2, | −1 |
| −1, 0, 1 | 0 |
| 2, 3 | 1 |
| 4, 5 | 2 |
| 6, 7 | 3 |
| 8, 9 | 4 |
| 10, 11 | 5 |
| 12, 13 | 6 |
| 14 and over | 7 |

According to Table 4, an x value that the range adjuster 304 can correctly express ranges between −16 and 14. That is, the range adjuster 304 cannot correctly express an x value smaller than −16 and an x value larger than 14. According to Table 4, an x value smaller than −16 is expressed as −8, and an x value larger than 14 is expressed as 7. Table 5 illustrates a possible expression range in the range adjuster 304 for k=2.

TABLE 5

| Value of x | Value of y |
| --- | --- |
| −32 and below | −8 |
| −31, −30, −29, −28 | −7 |
| −27, −26, −25, −24 | −6 |
| −23, −22, −21, −20, | −5 |
| −19, −18, −17, −16 | −4 |
| −15, −14, −13, −12 | −3 |
| −11, −10, −9, −8 | −2 |
| −7, −6, −5, −4 | −1 |
| −3, −2, −1, 0, 1, 2, 3 | 0 |
| 4, 5, 6, 7 | 1 |
| 8, 9, 10, 11 | 2 |
| 12, 13, 14, 15 | 3 |
| 16, 17, 18, 19 | 4 |
| 20, 21, 22, 23 | 5 |
| 24, 25, 26, 27 | 6 |
| 28 and over | 7 |

According to Table 5, an x value that the range adjuster 304 can correctly express ranges between −32 and 28. That is, the range adjuster 304 cannot correctly express an x value smaller than −32 and an x value larger than 28. According to Table 5, an x value smaller than −32 is expressed as −8, and an x value larger than 28 is expressed as 7. As illustrated in Table 4 and Table 5, a possible expression range of the x is changed by adjusting the adjustment constant k.

The measurer 302 measures an output value of the range adjuster 304. The measurer 302 can measure each of possible output values of the range adjuster 304. Alternatively, the measurer 302 can divide possible output values of the range adjuster 304 into at least 3 sections, and measure values included in each of the sections. For example, if the possible output values are 8 in number and are divided into 4 sections, each section can include two values. Of course, the two values included in each section are adjacent to each other. A detailed description will now be made of a process of dividing possible output values into at least 3 sections.

The measurer 302 measures an output frequency of each bit value of a signal output from the range adjuster 304, and delivers the measured frequency to the controller 300. The controller 300 generates an adjustment constant using the output frequency of each bit value provided from the measurer 302. The controller 300 sets a time for which the measurer 302 will deliver the measured frequency, and delivers information on the set time (hereinafter referred to as "measurement time") to the measurer 302. The measurer 302 delivers an output frequency of each bit value output from the range adjuster 304 to the controller 300 for the measurement time. The output frequency measured for the measurement time is reset as soon as it is delivered to the controller 300. Although the measurement time can be changed according to a user's choice, it is generally set to a considerably long duration in order to increase accuracy.

Figure 4:
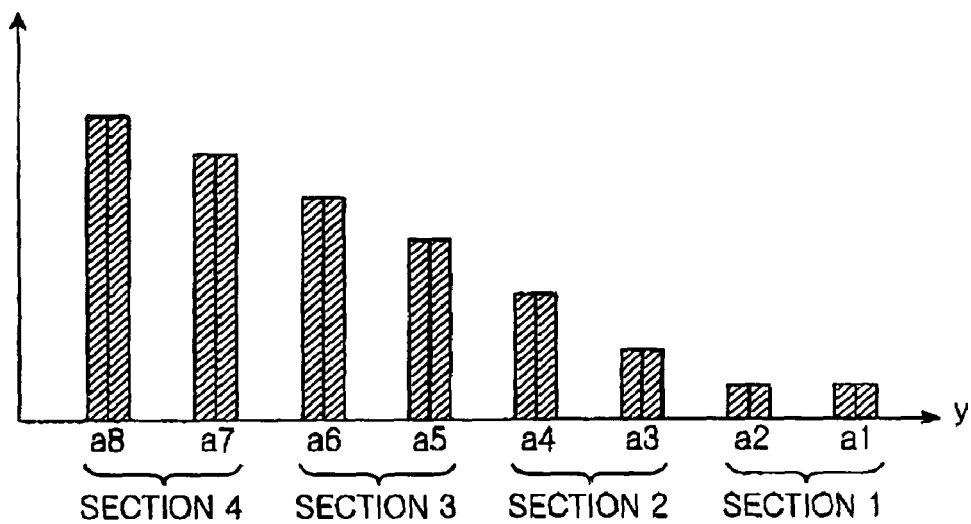
FIG. 4 is a diagram illustrating an input range before it is adjusted by the range adjuster in FIG. 3.
Figure 5:
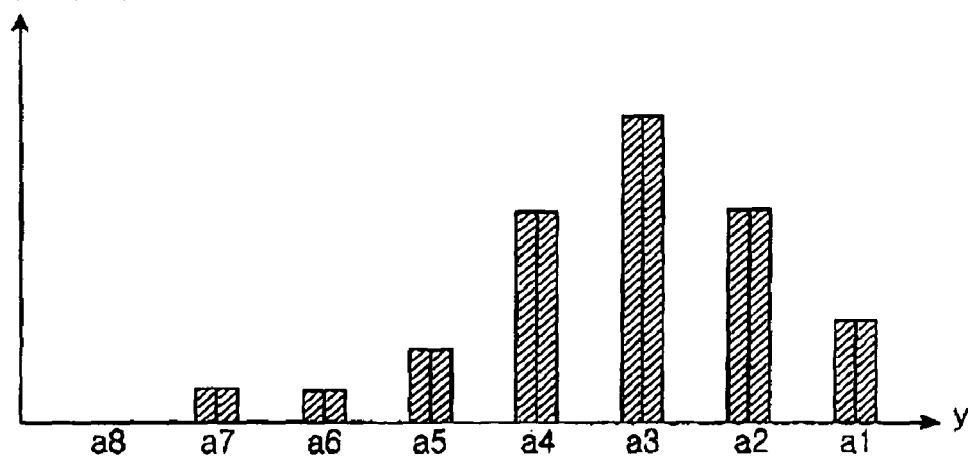
FIG. 5 is a diagram illustrating an input range after it is adjusted by the range adjuster in FIG. 3.

FIGS. 4 and 5 illustrate examples of expression ranges changed based on an adjustment constant generated by the controller 300 according to an embodiment of the present invention. Specifically, FIG. 4 illustrates an example of x values expressed based on an initially set adjustment constant, and FIG. 5 illustrates an example of x values expressed based on a modified adjustment constant. Now, with reference to FIG. 4, a description will be made of an example of x values expressed based on an initially set adjustment constant. In FIG. 4, the number of output bits from the range adjuster 304 is 6, by way of example. Therefore, the y has a value between −32 and 31. In FIG. 4, only the values between −32 and −1 are illustrated. Because the value between 0 and 31 are expressed in the same way as the values between −32 and −1, they are omitted from FIG. 4. A detailed description will now be made of an operation performed by the measurer 302.

The measurer 302 divides possible output values of the range adjuster 304 into at least 3 sections. In FIG. 4, the measurer 302 divides the possible output values into 4 sections, by way of example. Of course, because only the values between −32 and −1 are illustrated in FIG. 4, the value between −32 and 31 can be divided 8 sections. However, if transmission signal occurrence probabilities of both positive numbers and negative numbers are equal to 50%, only one of a section between −32 and −1 and a section between 0 and 31 can be selected. A section #1 represents a section where the y has a value between −1 and −8, a section #2 represents a section where the y has a value between −9 and −16, a section #3 represents a section where the y has a value between −17 and −24, and a section #4 represents a section where the y has a value between −25 and −32. The measurer 302 can measure at least one value representing each section, instead of measuring all of the y values included in each section. An increase in number of the measured representative values contributes to an increase in accuracy, but increases complexity undesirably. Therefore, the number of representative values measured in each section should be set taking the accuracy and complexity into consideration. For example, in FIG. 4, the number of representative values measured in each section is set to 2. Representative values in the section #1 are a1 and a2, representative values in the section #2 are a3 and a4, representative values in the section #3 are a5 and a6, and representative values in the section #4 are a7 and a8.

The measurer 302 measures output frequencies of the y values corresponding to a1 and a2 in the section #1 among the y values output from the range adjuster 304 for the measurement time, and delivers the measured result to the controller 300. The measurer 302 measures output frequencies of the y values corresponding to a3 and a4 in the section #2 among the y values output from the range adjuster 304 for the measurement time, and delivers the measured result to the controller 300. The measurer 302 measures output frequencies of the y values corresponding to a5 and a6 in the section #3 among the y values output from the range adjuster 304 for the measurement time, and delivers the measured result to the controller 300. The measurer 302 measures output frequencies of the y values corresponding to a7 and a8 in the section #4 among the y values output from the range adjuster 304 for the measurement time, and delivers the measured result to the controller 300.

The controller 300 compares the output frequencies provided for the respective sections. In FIG. 4, the output frequencies of the section #4 is highest, indicating that it is not possible to express all of the x values with the previously set adjustment constant. Therefore, it is necessary to adjust the adjustment constant. The controller 300 increases a value of the adjustment constant k. FIG. 5 illustrates an example of x values expressed based on an adjustment constant doubled by the controller 300. According to Equation (1), Table 4 and Table 5, if the adjustment constant is doubled, the number of x values that can be expressed is also doubled.

Figure 6:
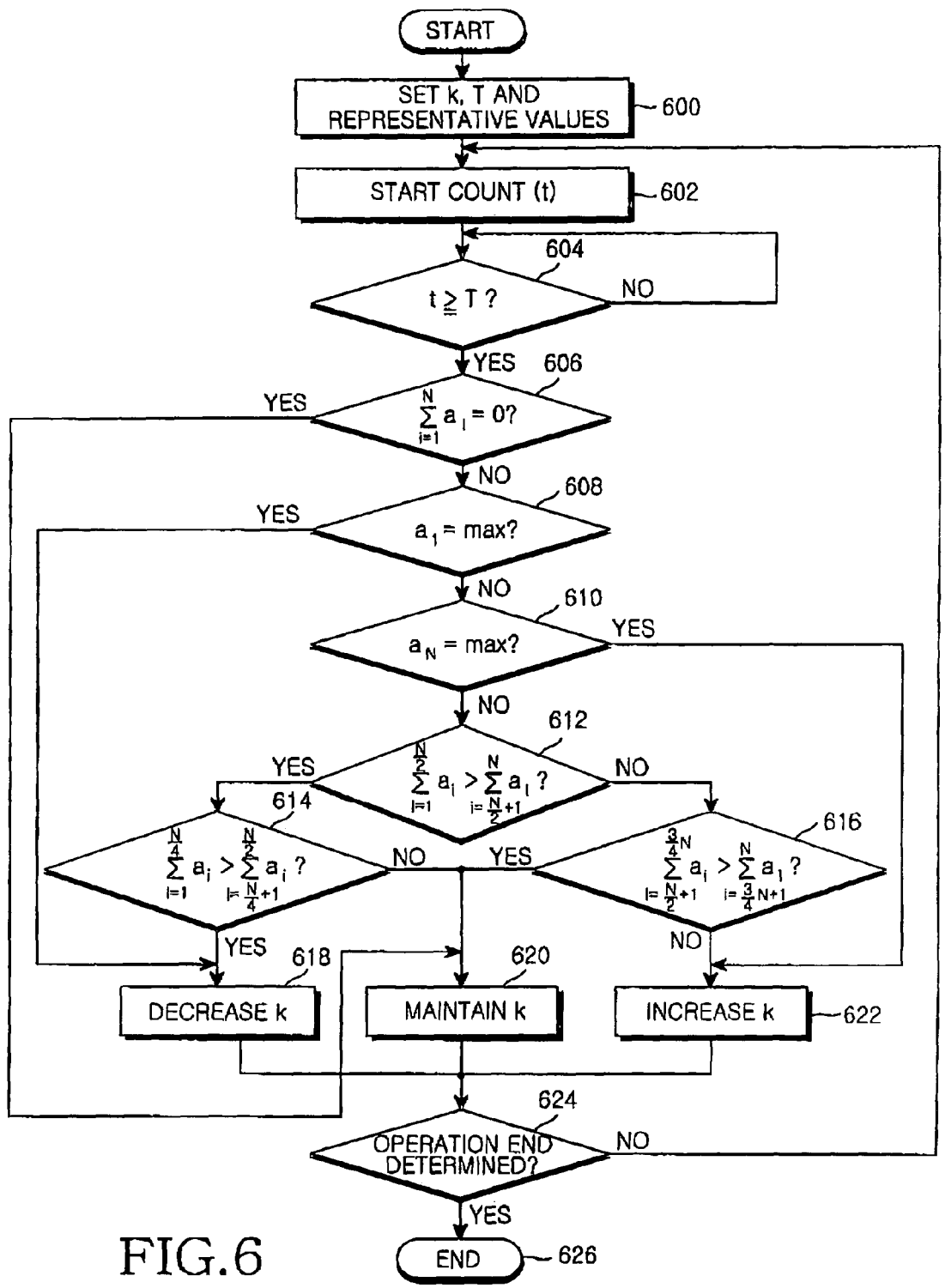
FIG. 6 is a flowchart illustrating an operation performed in a receiver according to an embodiment of the present invention.

FIG. 6 is a flowchart illustrating an operation performed in a controller and a measurer according to an embodiment of the present invention. With reference to FIG. 6, a detailed description will now be made of an operation performed in a controller and a measurer according to an embodiment of the present invention.

In step 600, the controller sets k, T and representative values a1 to aN. Herein, k denotes an adjustment constant, and T denotes a measurement period. In step 602, the controller starts a count t. In step 604, the controller determines whether the t has arrived at measurement period T. If the t has arrived at measurement period T, the controller proceeds to step 606, and if the t has not arrived at measurement period T yet, the controller returns to step 604. If the t has arrived at measurement period T, the measurer delivers measured information to the controller. The information delivered by the measurer includes output frequencies of the respective representative values.

In step 606, the controller sums the provided output frequencies of the respective representative values. If the summation result is 0, the controller proceeds to step 620, and if the summation result is not 0, the controller proceeds to step 608. That the summation result is 0 indicates that a y value corresponding to a specific representative value has not been output for the measurement period. In step 608, the controller determines whether a representative value having the highest output frequency among the provided output frequencies of the representative values is a1. As illustrated in FIG. 4, the a1 is a value which is closest to 0. That the output frequency is highest at the a1 indicates that a desired expression range of x values is set wide. Therefore, the controller is required to subdivide the desired expression range of the x values, instead of narrowing the desired expression range. If the number of output frequencies for the a1 is largest, the controller proceeds to step 618, and if the number of output frequencies for the a1 is not largest, the controller proceeds to step 610.

In step 610, the controller determines whether a representative value having the highest output frequency among the provided output frequencies of the representative values is aN. It can be understood that the aN is a representative value expressing the smallest y value. That the output frequency is highest at the aN indicates that a desired expression range of x values is set narrow. Therefore, the controller is required to widen the desired expression range of the x values. If the number of output frequencies for the aN is largest, the controller proceeds to step 622, and if the number of output frequencies for the aN is not largest, the controller proceeds to step 612.

In step 612, the controller compares the sum of a1 to aN/2 with the sum of (aN/2)+1 to aN. If the sum of a1 to aN/2 is larger than the sum of (aN/2)+1 to aN, the controller proceeds to step 614, and if the sum of a1 to aN/2 is smaller than or equal to the sum of (aN/2)+1 to aN, the controller proceeds to step 616.

In step 614, the controller compares the sum of a1 to aN/4 with the sum of (aN/4)+1 to aN. If the sum of a1 to aN/4 is larger than the sum of (aN/4)+1 to aN, the controller proceeds to step 618, and if the sum of a1 to aN/4 is smaller than or equal to the sum of (aN/4)+1 to aN, the controller proceeds to step 620. In step 616, the controller compares the sum of (aN/2)+1 to a3N/4 with the sum of (a3N/4)+1 to aN. If the sum of (aN/2)+1 to a3N/4 is larger than the sum of (a3N/4)+1 to aN, the controller proceeds to step 620, and if the sum of (aN/2)+1 to a3N/4 is smaller than or equal to the sum of (a3N/4)+1 to aN, the controller proceeds to step 622.

In step 618, the controller decreases a value of the k. In step 620, the controller maintains a value of the k. In step 622, the controller increases a value of the k. In step 624, the controller determines whether to end the operation. If it is determined to end the operation, the controller proceeds to step 626 where it end the operation. However, if it is determined not to end the operation, the controller returns to step 602.

Although the possible output values are divided into four sections in FIG. 6, when the possible output values are divided into five or more sections, steps 614 and 616 are subject to change. In the case where the possible output values are divided into 4 sections, the controller compares representative values of a section #1 with representative values of a section #2 in step 614, and compares representative values of a section #3 with representative values of a section #4 in step 616. However, in the case where the possible output values are divided into 6 sections (section #1 to section #6), the controller compares representative values of a section #1 with representative values of a section #3 in step 614, and compares representative values of a section #4 with representative values of a section #6 in step 616.

For convenience, the embodiment of the present invention has been described with reference to a transceiver using Binary Phase Shift Keying (BPSK). Therefore, there is only one section having a maximum count value among four sections. In this case, the number of bits is adjusted by adjusting a k value such that the section having the maximum count value should be located in the center of a range to be used for defining sections. However, in QPSK, there are two sections having the maximum count value within a range to be used for defining sections, the number of bits is adjusted by adjusting a k value such that the two sections should be located in the center of the range to be used for defining sections. For example, when five sections are defined, the k value can be adjusted such that a section having the maximum count value is located over second and third sections. In 8PSK, there are three sections having a large count value within a range used for defining sections, and in 16QAM, there are 4 sections having a large count value with a range used for defining sections. The k value should be adjusted in the method proposed by the present invention taking the modulation schemes into consideration.

As described above, the embodiment of the present invention automatically adjusts a possible expression range according to a characteristic of an input signal to a range adjuster, thereby improving performance of a soft-decision decoder. In addition, the embodiment of the present invention counts a signal output from a measurer without calculation, contributing to a reduction in complexity.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A method for adjusting the number of input bits to a decoder by a range adjuster in a Code Division Multiple Access (CDMA) mobile communication system, the method comprising the steps of:
   (a) dividing a range that can be expressed with the number of input bits inputted to the range adjuster into three or more sections;
   (b) counting output values of the respective sections outputted from the range adjuster for a predetermined time;
   (c) comparing a count output value of a specific section with other count output values of the other sections; and
   (d) adjusting the number of input bits to the decoder so that a distribution of the count output values of the sections have a predetermined distribution form,
   wherein the sections to be expressed are adjusted according to the number of input bit values mapped to one output bit value and the number of input bit values mapped to the one output bit value is proportional to the range of the sections to be expressed.

2. The method of claim 1, wherein the step (a) comprises the step of defining a section by selecting a range of negative values or a range of positive values when the negative values and the positive values are uniformly output on average.

3. The method of claim 1, wherein the step (d) comprises the step of adjusting the number of input bits so that a section having the maximum value should not lean to the left or right of a defined range.

4. The method of claim 1, wherein the distribution form of the count values of the respective sections, taken into consideration in the step (d), is determined according to a modulation scheme.

5. The method of claim 4, wherein the distribution form of the count values of the respective sections, taken into consideration in the step (d), has one maximum value within a range of the defined section for Binary Phase Shift Keying (BPSK), two maximum values for Quadrature Phase Shift Keying (QPSK), three maximum values for 8-ary Phase Shift Keying (8PSK), and four maximum values for 16-ary Quadrature Amplitude Modulation (16QAM).

6. A method for adjusting an expression section of input bit values according to the number of input bits in a mobile communication system that expresses only a defined partial section of the input bit values in order to make the number of output bits be smaller than the number of the input bits, and maps bit values included in unexpressed sections to a specific value, the method comprising the steps of:
   (a) dividing output bit values into at least three sections, and measuring output frequencies of output bit values for the respective sections for a predetermined time; and
   (b) adjusting the expression section, when an output frequency for a specific section is higher than the output frequencies for other sections,
   wherein the desired expression section is adjusted according to the number of input bit values mapped to one output bit value and the number of input bit values mapped to the one output bit value is proportional to a range of a desired expression section.

7. The method of claim 6, wherein the step (a) comprises the step of defining at least one bit value among the output bit values for the respective sections as the output frequency, and counting an output frequency of the bit value defined.

8. The method of claim 6, wherein if the number of output bits is y, the possible output bit values range between $$-\frac{2^y}{2} \text{ and } \frac{2^y}{2} - 1.$$

9. The method of claim 8, wherein the bit values included in the unexpressed sections are expressed with $$-\frac{2^y}{2} \text{ or } \frac{2^y}{2} - 1.$$

10. The method of claim 9, wherein the possible expression section is extended when the output frequency is high in a section in which $$-\frac{2^y}{2} \text{ or } \frac{2^y}{2} - 1$$

is included.

11. The method of claim 10, wherein the possible expression section is narrowed when the output frequency is high in the section in which 0 is included.

12. An apparatus for adjusting a desired expression section of input bit values according to the number of input bits in a mobile communication system that expresses only a defined partial section of the bit values in order to make the number of output bits smaller than the number of the input bits, and maps bit values included in unexpressed sections to a specific value, the apparatus comprising:
a measurer for dividing possible output bit values into at least three sections, and measuring output frequencies of the output bits values for the respective sections for a predetermined time; and
a controller for adjusting the expression section, when an output frequency for a specific section is higher than the output frequencies for other sections, wherein the controller adjusts the desired expression section according to the number of input bit values mapped to one output bit value and the number of input bit values mapped to the one output bit value is proportional to a range of the desired expression section.

13. The apparatus of claim 12, wherein the measurer defines at least one bit value among the output bit values for the respective sections as the output frequency, and counts the output frequency of the bit value defined.

14. The apparatus of claim 13, wherein if the number of output bits is y, the possible output bit values range between $$-\frac{2^y}{2} \text{ and } \frac{2^y}{2} - 1.$$

15. The apparatus of claim 13, wherein the controller expresses the bit values included in the unexpressed sections with $$-\frac{2^y}{2} \text{ or } \frac{2^y}{2} - 1.$$

16. The apparatus of claim 15, wherein the controller extends the possible expression section when the output frequency is high in a section in which $$-\frac{2^y}{2} \text{ or } \frac{2^y}{2} - 1$$

is included.

17. The apparatus of claim 16, wherein the controller narrows the possible expression section when the output frequency is high in the section in which 0 is included.

* * * * *